United States Patent [19]

Komano

[11] Patent Number: 5,375,005
[45] Date of Patent: Dec. 20, 1994

[54] LIQUID CRYSTAL DISPLAY DEVICE FOR EFFECTIVELY SUPPORTING LIQUID CRYSTAL PLATE AND ILLUMINATING DEVICE

[75] Inventor: Masakazu Komano, Yamato-Koriyama, Japan

[73] Assignee: Sharp Kabushiki Kaisha, Osaka, Japan

[21] Appl. No.: 212,678

[22] Filed: Mar. 11, 1994

Related U.S. Application Data

[63] Continuation of Ser. No. 942,655, Sep. 9, 1992, abandoned.

[30] Foreign Application Priority Data

Sep. 10, 1991 [JP] Japan ................................. 3-230300

[51] Int. Cl.$^5$ ............................................ G02F 1/1335
[52] U.S. Cl. ............................................ 359/48; 359/83
[58] Field of Search ..................... 359/48, 82, 83, 88

[56] References Cited

U.S. PATENT DOCUMENTS

| | | | |
|---|---|---|---|
| 4,111,533 | 9/1978 | Nakamura et al. | 359/63 |
| 4,165,607 | 8/1979 | Fedorowicz et al. | 58/50 |
| 4,367,467 | 1/1983 | Emile, Jr. | 359/83 |
| 4,755,035 | 7/1988 | Kopish et al. | 359/48 |
| 4,937,709 | 6/1990 | Yanagi et al. | 362/31 |
| 5,182,660 | 1/1993 | Tanaka | 359/83 |

FOREIGN PATENT DOCUMENTS

| | | | |
|---|---|---|---|
| 0111233 | 5/1987 | Japan | 359/83 |
| 0118818 | 5/1989 | Japan | 359/83 |
| 0085880 | 3/1990 | Japan | 359/83 |
| 4-9984 | 1/1992 | Japan | |

*Primary Examiner*—William L. Sikes
*Assistant Examiner*—Huy Mai
*Attorney, Agent, or Firm*—David G. Conlin; George W. Neuner

[57] ABSTRACT

A liquid crystal display device includes a liquid crystal display plate (11) having corner portions thereof, a illuminating device (12) for illuminating the liquid crystal display plate (11) from a rear side of the liquid crystal display plate (11), the illuminating device (12) including a light guiding plate (21) disposed on a rear side of parallel to the liquid crystal display plate (11) and a source (22) disposed at an end portion of the light guiding plate (21), a supporting frame (13) for supporting the illuminating device (12), the supporting frame (13) having corner portions thereof, holding members (31a, 31b, 31c, disposed on the corner portions of the supporting frame (13) for holding the corner portions of the liquid crystal display plate (11) in an electrically insulating state, and an engaging unit (32) for engaging the holding members (31a, 31b, 31c, 31d) with the supporting frame (13).

8 Claims, 7 Drawing Sheets

LIQUID CRYSTAL DISPLAY DEVICE FOR EFFECTIVELY SUPPORTING LIQUID CRYSTAL PLATE AND ILLUMINATING DEVICE

This is a continuation of copending application Ser. No. 07/942,655 filed on Sep. 9, 1992 now abandoned.

BACKGROUND OF THE INVENTION

1. Field of the Invention

The present invention relates to a transmission type liquid crystal display device with an illumination device including a light source and a light guiding plate for guiding the light from the light source to a liquid crystal display plate.

2. Description of the Related Art

The inventors of the present application know that a liquid crystal display device having a structure of positioning a supporting frame and a liquid crystal display plate. conventional liquid crystal display device.

In the above-mentioned liquid crystal display device, the liquid crystal display plate is supported between one of the metal supporting frames and the other supporting frame having a similar structure to that of the supporting frame. The supporting frame is fixed to, for example, a casing or a printed-circuit board of an electronic apparatus. The liquid crystal display plate includes a pair of glass plates and a liquid crystal sealed between the glass plates. The display region of the liquid crystal display plate is exposed through a window formed in the supporting frame.

In the above-mentioned liquid crystal display device, perform positioning between the liquid crystal display plate and the supporting frame, lugs are formed on each of the four corners of one of the supporting frames, and small plate-like holding members made of an elastic material, such as rubber, are fixed to the lugs, respectively, using an adhesive. The holding members are in contact with the side surfaces of the glass plates of the liquid crystal display plate. The provision of the holding members prevents direct contact of the glass plates to the lugs, hence prevents any damage to the glass plates.

In the above-mentioned liquid crystal display device, since it is necessary for the small holding members to be pasted to the lugs using an adhesive and forceps, workability deteriorates. Also, the working time is prolonged, deteriorating the productivity.

Whereas the structure of positioning the supporting frame and the liquid crystal display plate in a transmission type liquid crystal display device having an illuminating device on the rear side thereof, a mechanism for fixing the light and light guiding plate of the illuminating device must provided in addition to the aforementioned supporting structure, thus making the assembly thereof more difficult.

Therefore, in the field of the transmission type liquid crystal display device, an improved structure of positioning the individual components has been desired.

SUMMARY OF THE INVENTION

It is therefore an object of the present invention provide a transmission type liquid crystal display device having an illuminating device on the rear side thereof which enables a liquid crystal display plate and the illuminating device to be effectively supported and which assures easy assembly.

The object of the present invention can be achieved by a liquid crystal display device comprising a liquid crystal display plate having corner portions thereof, an illuminating device for illuminating the liquid crystal display plate from a rear side of the liquid crystal display plate, the illuminating device having a light guiding plate disposed on a rear side of and parallel to the liquid crystal display plate and a light source disposed at an end portion of the light guiding plate, the liquid crystal display device further comprising a supporting frame for supporting the illuminating device having corner portions thereof, includes holding units disposed on the corner portions of the supporting frame for holding the corner portions of the liquid crystal display plate in an electrically insulating state, and a unit for engaging the holding units with the supporting frame.

Preferably, the holding unit includes a liquid crystal display plate positioning unit for positioning the liquid crystal display plate.

More preferably, the holding unit further includes guiding plate positioning unit for positioning the light guiding plate.

Further preferably, the holding unit further includes a light source positioning unit for positioning the light source.

The holding unit further includes a lead fixing unit for fixing input/output leads of the light source within the supporting unit, preferably.

The engaging unit includes lugs protruding from either the supporting unit or the holding unit, and recesses formed on the other and engaging with the lugs, preferably.

The liquid crystal display plate positioning unit preferably includes a notched portion formed on the holding unit, the notched portion having a supporting surface which can be brought into contact with the corner portion of the liquid crystal display plate.

The light guiding plate positioning unit comprises a contact wall of the holding unit which faces the light guiding plate, preferably.

The light source positioning unit comprises a pair of engaging claws which protrude from the holding unit toward the light source.

Preferably, the lead fixing unit comprises grooves formed in the holding unit.

More preferably, the liquid crystal display device further includes a lead extension guiding unit which is removably attached on the supporting unit to externally extend a bundle; of the input/output leads of the light source.

In operation, the lugs of the engaging unit are brought into engagement with the recesses to engage the holding unit with the supporting unit. The corner portion of the light guiding plate is brought into contact with the contact wall of the light guiding plate positioning unit to position the light guiding plate. The light source is brought into engagement with the engaging claws of the light source positioning unit and is thereby positioned. The input/output leads are fitted into and thereby fixed to the grooves of the lead fixing unit. The corner portion of the liquid crystal display plate is brought into engagement with the notched portion of the liquid crystal display plate positioning unit to position the liquid crystal display plate. When the light source is to be mounted or removed for replacement or other reasons, the input/output leads are-mounted or removed together with the lead extension guiding unit to prevent entangling of the input/output leads.

Although the above-described embodiment employs four types of holding members, it may use only one type of holding member having the functions provided by the four types of holding members.

As will be understood from the foregoing description, since the supporting frame, the liquid crystal display plate, the light guiding plate, the light sources and the input/output leads can be positioned using the common holding members, it is not necessary to provide the holding member for each of these components, and the number of parts can thus be reduced.

Since the holding member is made of an electrical insulating material, an electrical insulation is achieved between the holding member and the thin metal bezel, and the use of an insulating resin frame which increases the thickness of the supporting frame can be eliminated. Thus, the thinning of the liquid crystal display device can be achieved. Furthermore, the relative positioning between the supporting frame, the liquid crystal display plate and the illuminating device can be reliably performed by the holding members fixed to the supporting frame by the simple work, the percentage of rejects can be reduced.

Furthermore, since the lead extension guiding unit for guiding the extension of the leads of the light source is made removable from the supporting frame, the mounting and removing work of the light source is facilitated.

Further objects and advantages of the present invention will be apparent from the following description of the preferred embodiments of the invention as illustrated in the accompanying drawings.

DESCRIPTION OF THE PREFERRED EMBODIMENTS

Referring to the accompany drawings, a preferred embodiment of the liquid crystal display device according to the present invention will be described in details.

Figure 1:
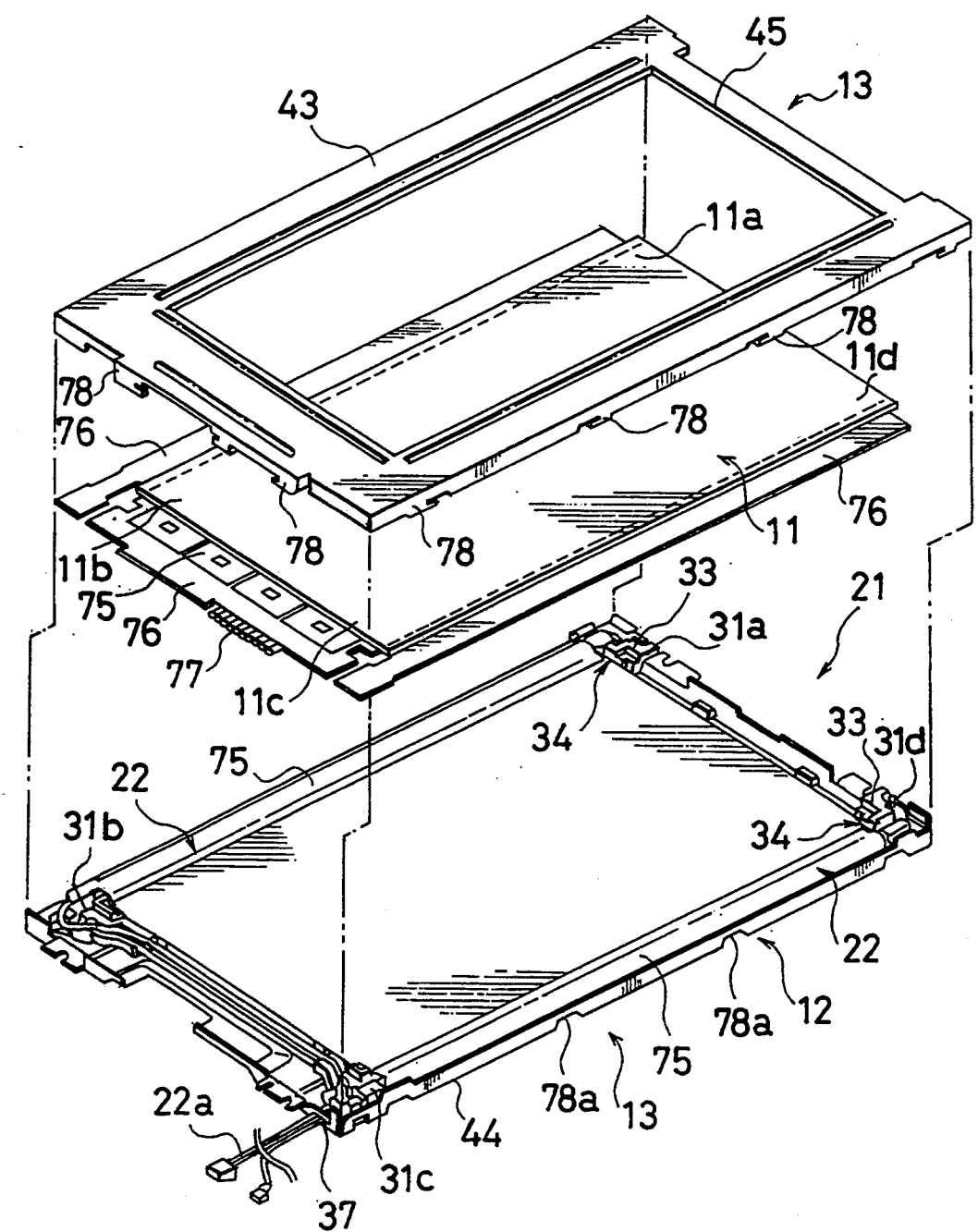
FIG. 1 is a perspective view of a liquid crystal display device according to an embodiment of the present invention showing a state wherein a liquid crystal display plane is not yet mounted.

FIG. 1 shows an embodiment of a liquid crystal display device according to the present invention in a state that a liquid crystal display plate is not yet mounted.

A liquid crystal display device of FIG. 1 includes a liquid crystal display plate 11, an illuminating device 12 for illuminating the liquid crystal display plate 11 from a rear side of the liquid crystal display plate 11, and a metal supporting frame 13 for supporting the illuminating device 12.

The illuminating device 12 includes a light guiding plate 21 disposed on the rear side of and parallel to the liquid crystal display plate 11, and a light source 22 disposed at an end portion of the light guiding plate 21.

The holding members 31a through 31d, which are electrically insulating, are disposed on the four corner portions of the supporting frame 13, respectively. Each of the holding members 31a through 31d is engaged with the supporting frame 13 by means of an engaging unit 32. The liquid crystal display plate 11 is positioned relative to each of the holding members 31a through 31d by means of a liquid crystal display plate positioning unit 33. The light guiding plate 21 is positioned relative to each of the holding members 31a through 31d by means of a light guiding plate positioning unit 34. The light source 22 is positioned relative to each of the holding members 31a through 31d by means of a light source positioning unit 35.

The input/output leads 22a of the light source 22 are fixed within the supporting frame 13 by means of a lead fixing unit 36. Further, the input/output leads 22a of the light source 22 are bundled and externally extended by means of a lead extension guiding unit 37.

The liquid crystal display plate 11, as shown in FIG. 1 is so formed that a liquid crystal is confined between a pair of glass plates, and having a flat-rectangular shape. The four corner portions 11a through 11d of the liquid crystal display plate 11 are held by the holding members 31a through 31d.

Figure 2:
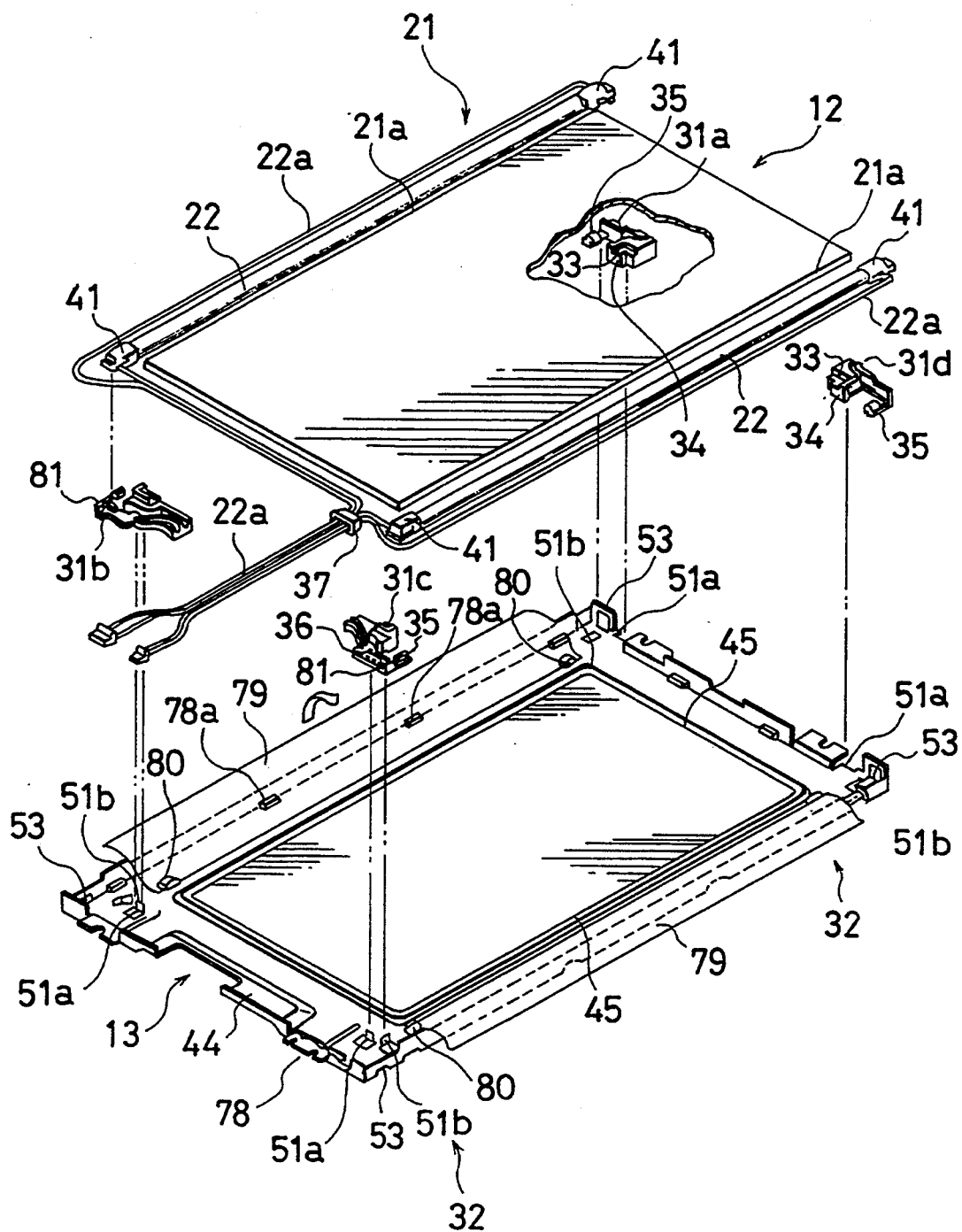
FIG. 2 is a perspective view of the liquid crystal display device of FIG. 1 showing a state wherein an illuminating device is not yet mounted.

The light guiding plate 21, as shown in FIG. 2, is formed in a plate shape by using translucent acrylate resin; for example.

Both of end-faces of the light guiding plate 21 in long-edge direction facing each other are functioned as light incident surfaces which is adapted to receive the light from the light source 22.

Figure 7:
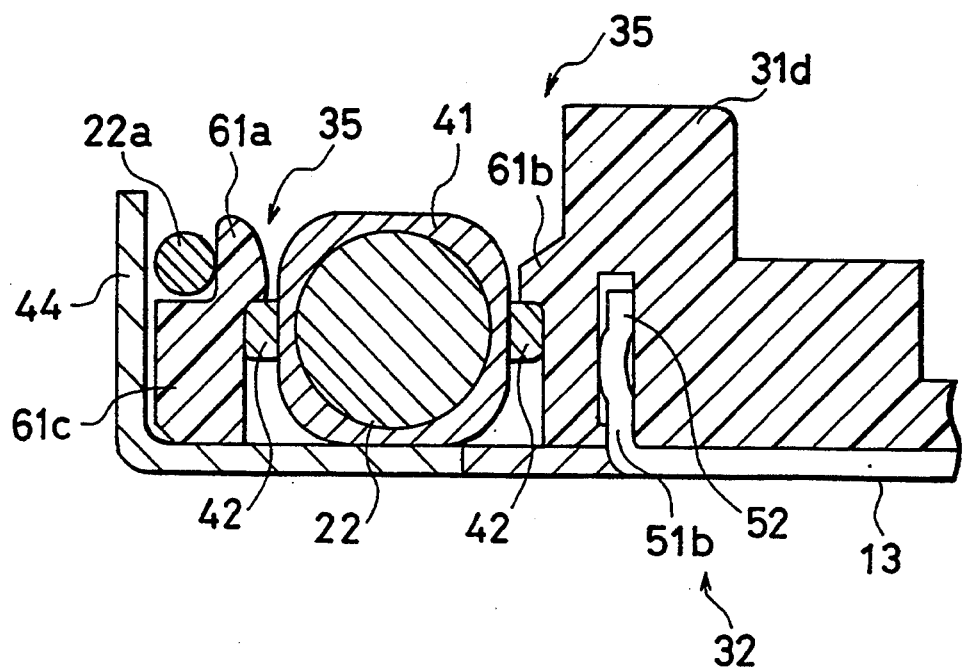
FIG. 7 is a cross-sectional view showing the positional relation between the fourth holding member and a light source.

The light source 22 uses a pair of cold cathode tubes in a straight-pipe type (CCFT), and a protection base 41 made of rubber to-insulate the electrode portions is attached to each of the edge portions thereof, as shown in FIG. 2. On a periphery of the protection base 41, as shown in FIG. 7, a of protrusions 42 having elasticity for engaging with the light source positioning unit 35 are formed. From both of the edge portions of the light source 22, as shown in FIG. 2, the input/output leads 22 are pulled out and connected to the external electrodes.

The supporting frame 13 is, as shown in FIGS. 1 and 2, composed of front-rear pair frame members 43, 44 (bezel) in almost square-like type, and supports the liquid crystal display plate 11 and the illuminating device 12 by pinching them. The supporting frame 13 is made of metal such as stainless steels with advantageous spreading characteristics, and possesses enough strength for supporting the liquid crystal display plate 11 and the illuminating device 12 through a folding. The window 45 in the supporting frame 13 is formed in a rectangular shape corresponding to the shape of the liquid crystal display plate 11 so as to expose the display region of the liquid crystal display plate 11 in a forward direction.

Figure 4:
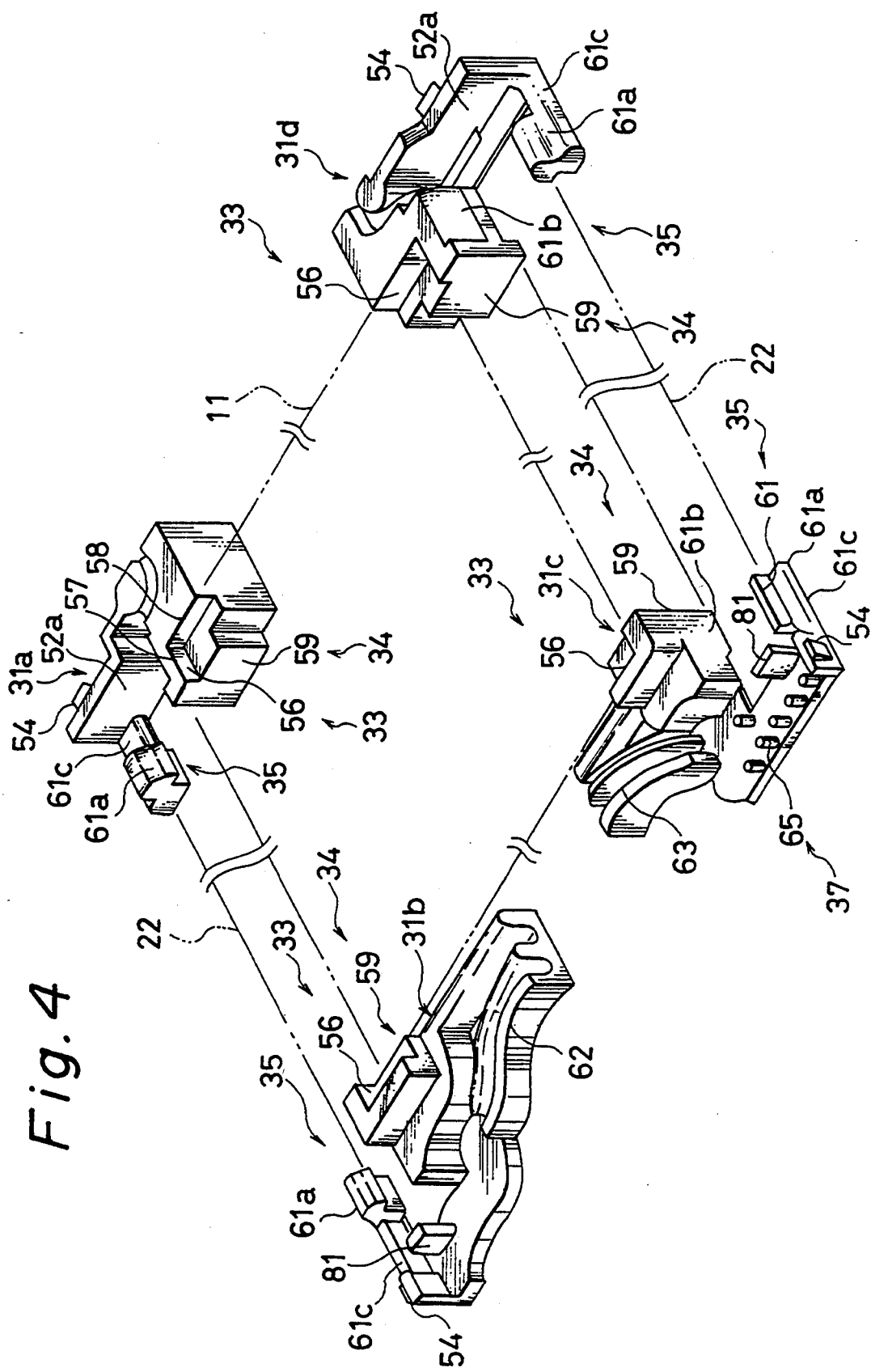
FIG. 4 is a perspective view of holding members.

The holding members 31a through 31d are, as shown in FIG. 4, formed by members of four kinds which differ according to the attaching positions on the supporting frame 13, and utilized for positioning of the supporting frame 13, the liquid crystal display plate 11, the light source 22, and the light guiding plate 21, each other.

Each of the holding members 31a through 31d is made of resin such as an ABS resin to provide an electrical insulation relative to the liquid crystal display plate 11 and the light source 22. The third holding member 31c is disposed at a position where input/output leads 22a are extended and at one end portion of one of the light sources 22. On the other end portion of that light source 22 is disposed the fourth holding member 31d. The first holding member 31a is disposed at one end portion of the other light source 22 and at the diagonal position of third holding member 31c, and the second holding member 31b is disposed at the other end of the other light source 22.

Each of the holding members 31a through 31d has the engaging unit 31, the liquid crystal display positioning unit 33, the light guiding plate positioning unit 34, and the light source positioning unit 35.

As shown in FIG. 2, the engaging unit 32 includes lugs 51a and 51b protruding in a forward direction from the inner surface of a rear frame member 44 of the supporting frame 13 and recesses 52 formed in the rear surface of each of the holding members 31a through 31d and engaged with the lugs 51a and 51b, as shown in FIG. 7.

As shown in FIG. 2, the pair of lugs 51a and 51b are disposed on each of the four corner portions of the frame member 44 perpendicular to each other. The recesses 52 are disposed on the rear surface of each of the holding members 31a through 31d at positions corresponding to the lugs 51a and 51b. Therefore, the movements of the holding members 31a through 31d in the longitudinal and lateral directions are restricted by the perpendicular lugs 51a and 51b.

Figure 5:
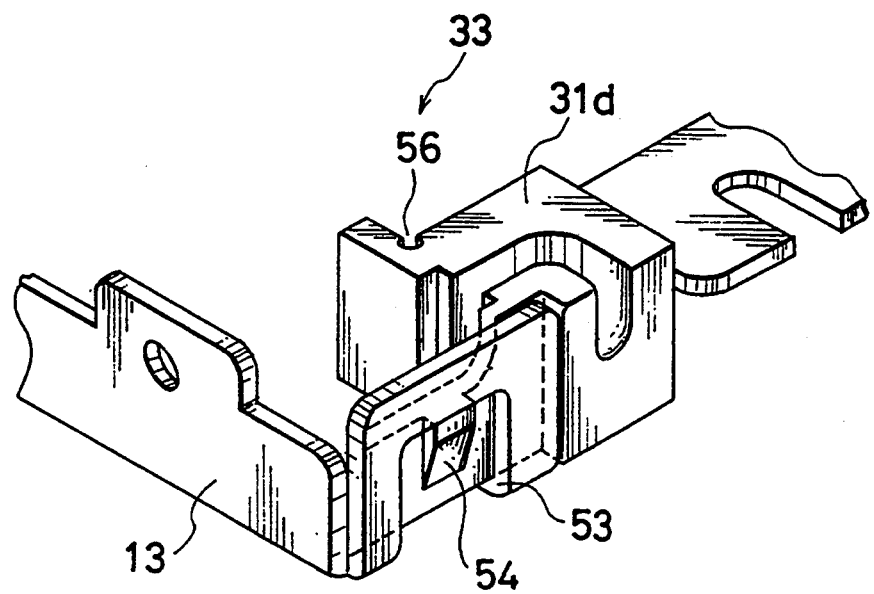
FIG. 5 is a perspective view showing how a fourth holding member is mounted on a supporting frame.
Figure 9:
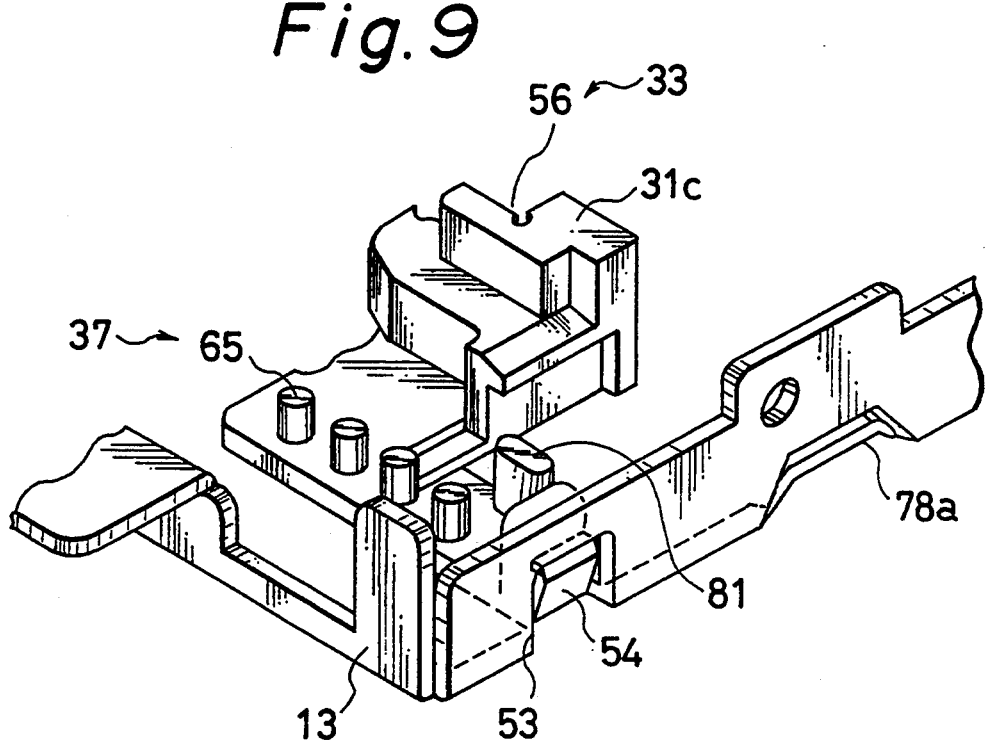
FIG. 9 is a perspective view showing how a third holding member is mounted on the supporting frame.

As shown in FIGS. 5 and 9, a hook 54 is formed on each of the holding members 31a through 31d. The hook 54 is engaged with a small hole 53 formed in each of the four corner portions of the supporting frame 13, whereby coming off of each of the holding members 31a through 31d in a forward direction is prevented.

The liquid crystal display plate positioning unit 33 includes a rectangular notch portion 56 formed on the inner and front portion of each of the holding members 31a through 31d so that it can be brought into contact with the corner portion of the liquid crystal display plate 11.

As shown in FIG. 4, the liquid crystal display plate 11 is positioned by supporting surfaces 57 and 58 of the notch portion 56 which are disposed perpendicular to each other.

The light guiding plate positioning unit 34 includes a contact wall 59 disposed on the wall surface of each of the holding members 31a through 31d adjacent to and on the rear side of the notch portion 56, as shown in FIG. 4. The contact wall 59 faces a window 45 of the supporting frame 13. The light guiding plate positioning unit 34 prevents a deviation of the light guiding plate 21 in the axial direction of the light source 22, that is, the light guiding plate positioning unit 34 positions-the light guiding plate 21 in the longitudinal direction. The positioning of the light guiding plate 21 in the lateral direction is performed by lugs 80 provided on the supporting frame 13.

As shown in FIGS. 4 and 7, the light source positioning unit 35 includes a pair of engaging claws 61a and 61b which are engaged with protrusions 42 of the protection base 41 of the light source 22 to prevent coming off of the light source in a forward direction. The outer engaging claw 61a is coupled to each of the holding members 31a through 31d through a coupling portion 61c. The inner engaging claw 61b protrudes in an outward direction from an outer surface which is perpendicular to the contact wall 59. The two engaging claws 61a and 61b are separated from each other by a distance which is the same as the diameter of the protection base 41 of the light source 22.

As shown in FIG. 7, the outer surface of the outer engaging claw 61a has the function of fixing the input/output lead 22a between the side wall of the frame member 44 and the engaging claw 61a when each of the holding members 31a through 31d is mounted on the frame member 44.

Figure 8:
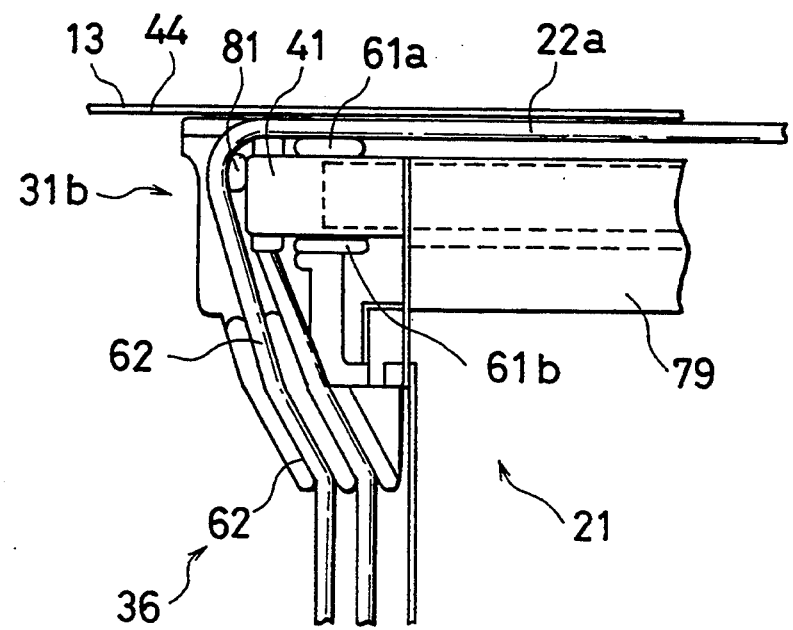
FIG. 8 is a plan view showing the positional relation between a second holding member and input/output leads

The lead fixing unit 36 is disposed on the second and third holding members 31b and 31c, as shown in FIGS. 4 and 8 The fixing unit disposed on the second holding member 31b includes two first grooves 62 for guiding the input/output leads 22a extended from the end portion of one of the light sources 22 toward the third holding member 31c.

The fixing unit disposed on the third holding member 31c includes a second groove 63 for guiding the input/output leads 22a guided by the first grooves 62 in such a manner that the leads 22a are connected to the input/output leads 22a of the other light source 22. The first and second grooves 62 and 63 extend from the distal end of the protection base 41 of the light source 22 in a direction perpendicular to the axial direction of the light source 22.

Figure 10:
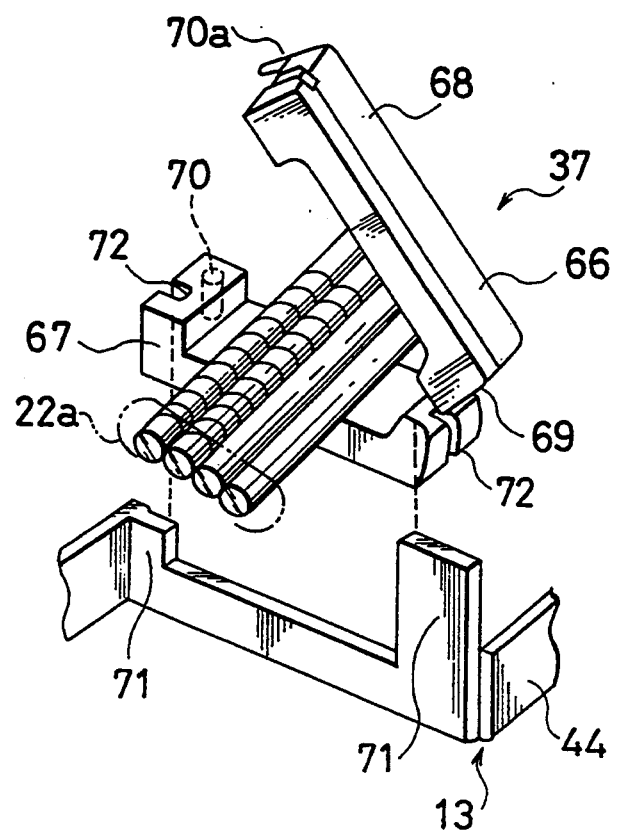
FIG. 10 is a perspective view of a lead fixing means.

The lead extension guiding unit 37 includes a plurality of ribs 65 (for example, 5 ribs) formed on the third holding member 31c, shown in FIGS. 4 and 9, and a bushing 66 for pressing a bundle of input/output leads 22a extended in the spaces formed between the ribs 65 in the forward and backward directions and thereby fixing the leads 22a, shown in FIG. 10

The ribs 65 prevent twining of the leads 22a near the third holding member 31c, i.e., at the extended portion. The ribs 65 have a comb-like shape and is located at a position at where they face the bushing 66.

As shown in FIG. 10, the bushing 66 includes a female portion 67, a male portion 68, and a hinge 69. The female and male portions 67 and 68 are coupled to each other by the fitting of a rib 70a into a hole 70 to hold the input/output leads 22a. The bushing is made of a synthetic resin, such as nylon, so that it does not damage the leads 22a. The outer peripheral surface of the female portion 67 of the bushing 66 has an engaging groove 72 which is engaged with a side wall 71 of the supporting frame 13.

Figure 3:
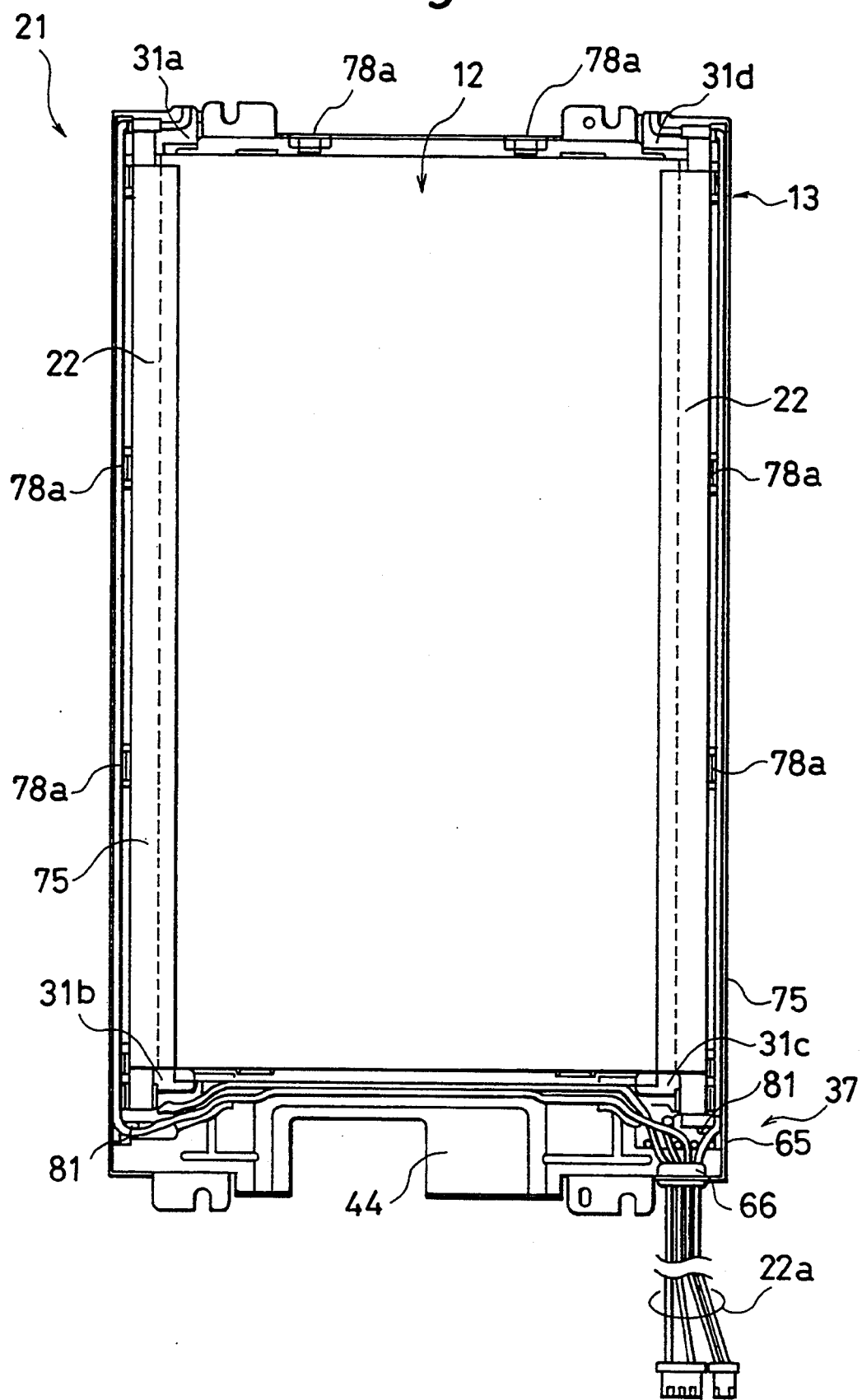
FIG. 3 is a plan view of the liquid crystal display device of FIG. 1 showing a state wherein the illuminating device has been mounted.

In FIG. 1, a reference numeral 75 denotes a TAB (tape automated bonding) film connected to electrodes formed on a glass plate of the liquid crystal display plate 11, a reference numeral 76 denotes a circuit substrate connected to the TAB films 75, the circuit substrate 76 being notched so that it can avoid the liquid crystal display plate positioning unit 33, a reference numeral 77 denotes a connector, a reference numeral 78 denotes claw portions for engaging the front and rear frame members 43 and 44 of the supporting frames 13 with each other, a reference numeral 78a denotes recesses engaged with the claw portions 78, the claw portions 78 being bent at the recessed portions 78a to fix the front and rear frame members 43 and 44 to each other. In FIGS. 2 and 3, a reference numeral 79 denotes a white PET sheet having a high reflectance so that it can effectively guide the light from the light source 22 to the guiding plate 21, and a reference numeral 80 denotes a protrusion for positioning the light guiding plate 21. In FIGS. 2 through 4, a reference numeral 81 denotes a stopper for preventing deviation of the light source 22 in the axial direction thereof.

To assemble the aforementioned structure, first, the holding members 31a through 31d are engaged with the supporting frame 13 at predetermined positions, as shown in FIG. 2. At that time, the lugs 51a and 51b of the supporting frame 13 are brought into engagement with the recessed portions 52 of the-holding members 31a through 31d. At the same time, the hooks 54 are engaged with the small holes 53 of the supporting frame 13 to prevent coming off of the holding members 31a through 31b from the supporting frame 13, as shown in FIGS. 5 and 9.

As shown in FIG. 2, the light guiding plate 21 is positioned such that it is in contact with the contact walls 59 of the holding members 31a through 31d and the protrusions 76 of the supporting frame 13.

The white PET sheet 76 for effectively guiding the light from the light source 22 to the light guiding plate 21 is pasted on the supporting frame 13 parallel to each of the long sides of and on each of the rear end portions of the light guiding plate 21 using a two-sided tape.

Thereafter, each of the light sources 22 is fixedly fitted into the holding members 31a through 31d utilizing the contraction of the protection base 41 thereof. At that time, as shown in FIG. 7, the protrusions 42 of the protection base 41 are moved on the rear sides of the engaging claws 61a and 61b of the light source positioning unit 35 and are fixed thereto utilizing the elastic force of the rubber protective base 41.

After the light source 22 shown in FIG. 2 has been fixed, the PET sheet 75 is curved and then pasted to the front surface of the light guiding plate 21 using a two-sided tape.

Subsequently, the input/output leads 22a of the light sources 22 are extended using the holding members 31a through 31d.

Figure 6:
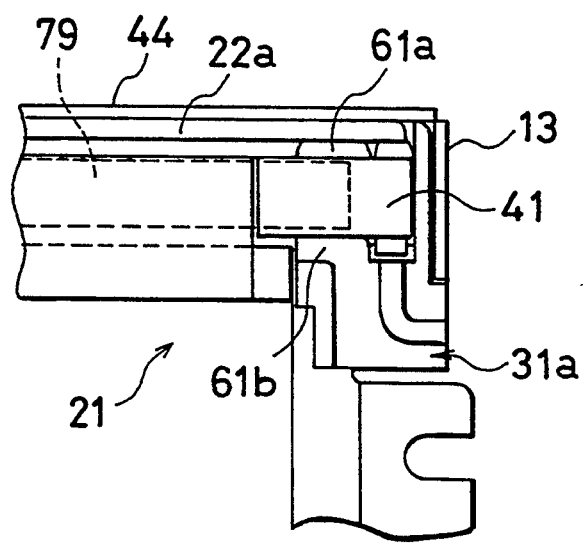
FIG. 6 is a plan view of a first holding member.

Regarding the first, second and fourth holding members 31a, 31b and 31d where the input/output lead 22a is not directly extended externally, the input/output lead 22a extended from the protective base 41 are fixed between the coupling portion 61c of the engaging claw 61a and the longitudinal side wall of the supporting frame 13, as shown FIGS. 6 and 8.

Particularly, in the second holding member 31b, the input/output leads 22a extended from the protection bases 41 are fixedly fitted into the grooves 62, as shown in FIG. 8. The input/output leads 22a guided by the grooves 62 are fitted into the groove 63 of the third holding member 31c shown in FIG. 4.

Thereafter, the input/output leads 22a are combined with the input/output leads 22a of the light source 22 held by the third holding member 31c. The combined input/output leads 22a are gripped by the five ribs 64 of the third holding member shown in FIG. 9.

As shown in FIG. 10, the input/output leads 22a are passed through the open female portion 67 and male portion 68 of the bushing 66, and then the female portion 67 and the mate portion 68 are closed. Thereafter, the engaging groove 72 of the bushing 88 is brought into engagement with the lateral side wall 71 of the supporting frame 13 to engage the bushing 66 with the supporting frame 13.

Next, the liquid crystal display plate 11 shown in FIG. 1 is fitted into the notched portions 56 of the holding members 31a through 31d which are the liquid crystal display plate positioning unit 33 to position the liquid crystal display plate 11.

Thereafter, the front frame member 43 shown in FIG. 1 is fitted to the rear frame member 44, and the claw portions 78 are bent and engaged with the rear frame member 44, whereby the liquid crystal display plate 11 and the illuminating device 12 are held between the front and rear frame members 43 and 44.

In the transmission type liquid crystal display device in which the liquid crystal display plate is gripped by the pair of metal supporting frames 13, one or both of the supporting frames 13 have the lugs 51a and 51b. The holding members 31a through 31d made of a synthetic resin are engaged with the lugs 51a and 51b, and the side surface of the liquid crystal display plate 11 is brought into contact with the holding members 31a through 31d. Consequently, positioning of the liquid crystal display plate 11 relative to the supporting frame 13 is facilitated.

Furthermore, the light sources 22 can be readily fixed the holding members 31a through 31d by fitting the protection base 41 of the light sources 22 into the holding members 31a through 31d.

The light guiding plate 21 for guiding the light from the light sources 22 to the liquid crystal display plate 11 can be readily positioned by bringing the side surface of the light guiding plate 21 into contact with-the holding members 31a through 31d.

An extension of the input/output leads 22a within the liquid crystal display device is facilitated by fitting them into the holding members 31a through 31d.

Thus, it is possible to provide a liquid crystal display device in which the liquid crystal display plate 11 and the illuminating device can be effectively supported and which assures easy assembly.

When the light source 22 is replaced with a new one, the input/output leads 22a may be twined, making the mounting and removal of the light source 22 difficult. However, since the bushing 66, serving as the lead extension guiding unit 37, for bundling and extending the input/output leads 22a of the light sources 22 are removable from the supporting frame 13, removal of the input/output leads 22 together with the lead extension guiding unit 37 prevent twining of the input/output leads 22a.

Having described our invention as related to the embodiment shown in the accompanying drawings, it is our intention that the invention be not limited by any of the details of description, unless otherwise specified, but modification and variation thereof are possible without departing from the spirit and scope thereof.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display device comprising a liquid crystal display plate having corner portions thereof;
an illuminating device for illuminating said liquid crystal display plate from a rear side of said liquid crystal display plate, said illuminating device having a light guiding plate disposed on a rear side of and parallel to said liquid crystal display plate and light sources disposed at opposite end portions of said light guiding plate;

a supporting frame for supporting said illuminating device having corner portions thereof;

holding members made of electrical insulating material disposed on said corner portions of said supporting frame and for holding said corner portions of said liquid crystal display plate in an electrically insulating state, corner portions of said light guiding plate and end portions of said light sources, each holding member including a liquid crystal display plate positioning means for positioning said liquid crystal display plate, a light guiding plate positioning means for positioning said light guiding plate, and a light source positioning means for positioning said light source, said liquid crystal display plate positioning means, light guiding plate positioning means and said light source positioning means being disposed individually at different positions of the holding member; and means for engaging said holding members with said supporting frame.

2. A liquid crystal display device according to claim 1, wherein said holding means further includes a lead fixing means for fixing input/output leads of said light source within said supporting means.

3. A liquid crystal display device according to claim 1, wherein said engaging means includes lugs protruding from either said supporting means or said holding means, and recesses formed on the other and engaging with said lugs.

4. A liquid crystal display device according to claim 1, wherein said liquid crystal display plate positioning means includes a notched portion formed on said holding means, said notched portion having a supporting surface which can be brought into contact with the corner portion of said liquid crystal display plate.

5. A liquid crystal display device according to claim 1, wherein said light guiding plate positioning means comprises a contact wall of said holding means which faces said light guiding plate.

6. A liquid crystal display device according to claim 1, wherein said light source positioning means comprises a pair of engaging claws which protrude from said holding means toward said light source.

7. A liquid crystal display device according to claim 2, wherein said lead fixing means comprises grooves formed in said holding means.

8. A liquid crystal display device according to claim 1, further comprising a lead extension guiding means which is removably attached on said supporting means to externally extend a bundle of said input/output leads of said light source.

* * * * *